(12) United States Patent  
Morrison (10) Patent No.: US 6,621,501 B2  
(45) Date of Patent: *Sep. 16, 2003

(54) PIXEL ZOOM SYSTEM AND METHOD FOR A COMPUTER GRAPHICS SYSTEM

(75) Inventor: Teresa M Morrison, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/068,906

(22) Filed: Feb. 8, 2002

(65) Prior Publication Data

US 2002/0075285 A1 Jun. 20, 2002

Related U.S. Application Data

(63) Continuation of application No. 09/288,734, filed on Apr. 9, 1999, now Pat. No. 6,421,063.

(51) Int. Cl.[7] ................................................. G09G 5/00
(52) U.S. Cl. ........................................ 345/660; 345/667
(58) Field of Search ................................ 345/660, 667, 345/668, 669, 670, 671

(56) References Cited

U.S. PATENT DOCUMENTS 5,335,296 A * 8/1994 Larkin et al. .................. 382/47

5,872,572 A * 2/1999 Rossignac .................... 345/428

* cited by examiner

*Primary Examiner*—Matthew Luu (57) ABSTRACT

A computer graphics system efficiently implements a pixel zoom function. The graphics system includes a rasterizer designed to define a new zoomed (enlarged or reduced) raster image of a region in an original raster image having pixels defined in a coordinate system with orthogonal first and second axes (x,y), the region comprising a plurality of original pixels. The region to be zoomed can be modified differently along its x, y axes. In other words, the region may be enlarged (positive zoom) along one axis, while reduced (negative zoom) along the other axis, or either enlarged or reduced by different magnitudes (zoomX, zoomY) along the x, y axes. Furthermore, the zoom magnitudes may be integers (integer zoomX, integer zoomY) or floating point numbers (float zoomX, float zoomY). The rasterizer is designed to (1) determine a starting raster position for the zoomed raster image; (2) determine a first number of first pixels along the first axis for each row of the original pixels; and (3) determine, for each row of the original pixels, a second number of second pixels along the second axis for each column of the original pixels. A rendering mechanism associated with the pixel zoom system is designed to render the zoomed image based upon the starting raster position, the first numbers corresponding with the original pixel rows, the second numbers corresponding with the original pixel columns.

20 Claims, 9 Drawing Sheets

PIXEL ZOOM SYSTEM AND METHOD FOR A COMPUTER GRAPHICS SYSTEM

CROSS-REFERENCE TO RELATED APPLICATION

This is a continuation of copending application Ser. No. 09/288,734 filed on Apr. 9, 1999 now U.S. Pat. No. 6,421,063, which is hereby incorporated by reference herein.

FIELD OF THE INVENTION

The present invention relates generally to graphics systems in computers, and, more particularly, to a system and method for efficiently implementing pixel zooms in such computer graphics systems.

BACKGROUND OF THE INVENTION

A computer graphics system, sometimes referred to as a graphics pipeline, accelerator, or engine, associated with a computer, for example, a personal computer or workstation, are commonly used for processing graphical data and displaying graphical representations of objects on two-dimensional computer display screens. Current computer graphics systems can provide highly detailed representations and are used in a variety of different applications.

In typical computers, particularly, in their computer graphics systems, an object to be represented on the computer display screen is defined by a plurality of graphics primitives. Primitives are basic components of a graphics picture and may include points, vectors (lines), and polygons, for example, triangles. Each primitive is made up of spans of picture elements (pixels). Hardware and/or software is implemented to render, or draw, on the two-dimensional display screen, the graphics primitives that represent the view of one or more objects being represented on the screen.

The primitives that define the three-dimensional object to be rendered are usually originated and provided to the graphics system by a central processing unit (CPU), which defines each primitive in terms of a set of primitive data. For example, when the primitive is a triangular primitive, then the CPU may define the primitive in terms of a set of x', y', z' pixel coordinates (unnormalized orthogonal coordinate system) corresponding with the triangular primitive's vertices, as well as set of color values (R, G, B values) for each vertex. Rendering hardware or software, associated with a rasterizer of the graphics system, ultimately interpolates the data from the CPU, typically after several other processing stages, in order to produce the x, y, z screen coordinates (normalized orthogonal coordinate system) corresponding with the pixels that are activated/deactivated to represent each primitive and the color values (R, G, B values) for each of the screen coordinates x, y, z. The x, y, z screen coordinate data is driven to a raster scan display device, such as a computer monitor, by the graphics system.

Generally, a pixel zoom is a feature made available to a user of the computer (and graphics system) that enables the user to enlarge and/or reduce a desired region of an image on a display screen. The user defines a region, or region, to be zoomed (enlarged or reduced) by any appropriate input(s), for example, defining a window around the region to be zoomed on a display screen. The region to be zoomed can be modified differently along its x, y axes. In other words, the region may be enlarged ($abs|zoom| \geq 1$) along one axis, while reduced ($abs|zoom| < 1$) along the other axis, or either enlarged or reduced by different magnitudes (zoomX, zoomY) along the x, y axes. Furthermore, the zoom magnitudes may be integers (integer zoomX, integer zoomY) or floating point numbers (float zoomX, float zoomY). Finally, enlargement along an axis (x or y) basically involves rendering an appropriate number of duplicates for each pixel in the zoomed region, while reduction along an axis generally involves deactivation of some of the pixels and strict copy of the others.

The OpenGL graphics specification, which is a well known computer graphics industry standard that was adopted around 1992, specifies a pixel zoom function, i.e., PixelZoom(float zoomX, float zoomY) performed at a raster position $x_{rp}$, $y_{rp}$ as a window defined by coordinates bounded by a rectangle with corners: ($x_{rp}$+zoomX*n, $y_{rp}$+zoomY*m) and ($x_{rp}$+zoomX*(n+1), $y_{rp}$+zoomY*(m+1)), where zoomX and zoomY are each a negative, positive, or zero amount of zoom, where n and m are respectively the row and the column of pixels in the image, and where the coordinates ($x_{rp}$,$y_{rp}$) defines the raster scan position in the two-dimensional x,y space of the image. Any partial pixel whose center lies inside of this rectangle (or on its bottom or left boundaries) are produced in correspondence with this particular group of elements.

Most, if not all, currently implemented rasterizers blindly implement a pixel-by-pixel check and replication/deactivation based on the aforementioned equations, which define a bounding box, or splat. Use of these equations is sometimes referred to as the "bounding box technique." The bounding box technique is undesirable in that it is very time consuming to implement, complicated, and computationally intensive, especially considering that the zoom function is performed on a pixel-by-pixel basis on every pixel in the region to be zoomed.

Thus, an unaddressed need exists in the industry for a more efficient and simplified way to implement pixel zooms in computer graphics systems associated with computers.

SUMMARY OF THE INVENTION

The present invention provides a pixel zoom system and method for computer graphics system of a computer for efficiently implementing a pixel zoom feature, or function or process. The pixel zoom system and method overcome the disadvantages and problems of the prior art, noted previously. Particularly, the pixel zoom system and method are less time consuming to implement, less complicated, and require far fewer mathematical computations, as compared to the prior art.

In architecture, the pixel zoom system includes a rasterizer designed to define a new zoomed (enlarged or reduced) raster image of a region in an original raster image having pixels defined in a coordinate system with orthogonal first and second axes (x,y), the region comprising a plurality of original pixels. The region to be zoomed can be modified differently along its x, y axes. In other words, the region may be enlarged ($abs|zoom|>1$) along one axis, while reduced ($abs|zoom|<1$) along the other axis, or either enlarged or reduced by different magnitudes (zoomX, zoomY) along the x, y axes. In addition, the region may be flipped or translated, about the x axis (zoomX<0) or flipped about the y axis (zoomY>0). Furthermore, the zoom magnitudes may be integers (integer zoomX, integer zoomY) or floating point numbers (float zoomX, float zoomY). The rasterizer is designed to (1) determine a starting raster position for the zoomed raster image; (2) determine a first number of first pixels along the first axis for each row of the original pixels; and (3) determine, for each row of the original pixels, a second number of second pixels along the second axis for each column of the original pixels. A rendering mechanism associated with the pixel zoom system is designed to render the zoomed image based upon the starting raster position, the first numbers corresponding with the original pixel rows, the second numbers corresponding with the original pixel columns.

The present invention can also be conceptualized as providing a method for efficiently implementing a pixel zoom function in a computer graphics system. In this regard, the method can be broadly and simply summarized by the following steps: (a) defining a zoomed raster image of a region in an original raster image having pixels defined in a coordinate system with orthogonal first and second axes, the region comprising a plurality of original pixels, by: (1) determining a starting raster position for said zoomed raster image; (2) determining a first number of first pixels along said first axis for each row of said original pixels; and (3) for each row of said original pixels, determining a second number of second pixels along said second axis for each column of said original pixels; and (b) rendering said zoomed image based upon said starting raster position, said first numbers corresponding with said original pixel rows, said second numbers corresponding with said original pixel columns.

Other features and advantages of the present invention will become apparent to one with skill in the art upon examination of the following drawings and detailed description. These additional features and advantages are intended to be included herein within the scope of the present invention and protected by the claims set forth in the latter part of this document.

BRIEF DESCRIPTION OF THE DRAWINGS

The present invention can be understood with preference to the following drawing. The drawing are not necessarily to scale, emphasis instead being placed upon clearly illustrating principles of the invention. Furthermore, in the drawings, like reference numerals designate corresponding parts throughout the several views.

DETAILED DESCRIPTION OF THE PREFERRED EMBODIMENT

To clearly understand the benefits of the present invention as compared to the prior art, it is necessary to fully understand the zoom feature, or function or process, associated with graphics systems of computers, such as conventional personal computers or workstations. Consider FIGS. 1A through 1E which graphically illustrate examples of zoom scenarios that can be implemented by prior art systems and that can also be efficiently implemented by the pixel zoom system 20 (first embodiment of FIGS. 2A and 2B and second embodiment of FIG. 4) and associated methodology of the present invention. These zoom function examples are fully described hereafter.

Figure 1A:
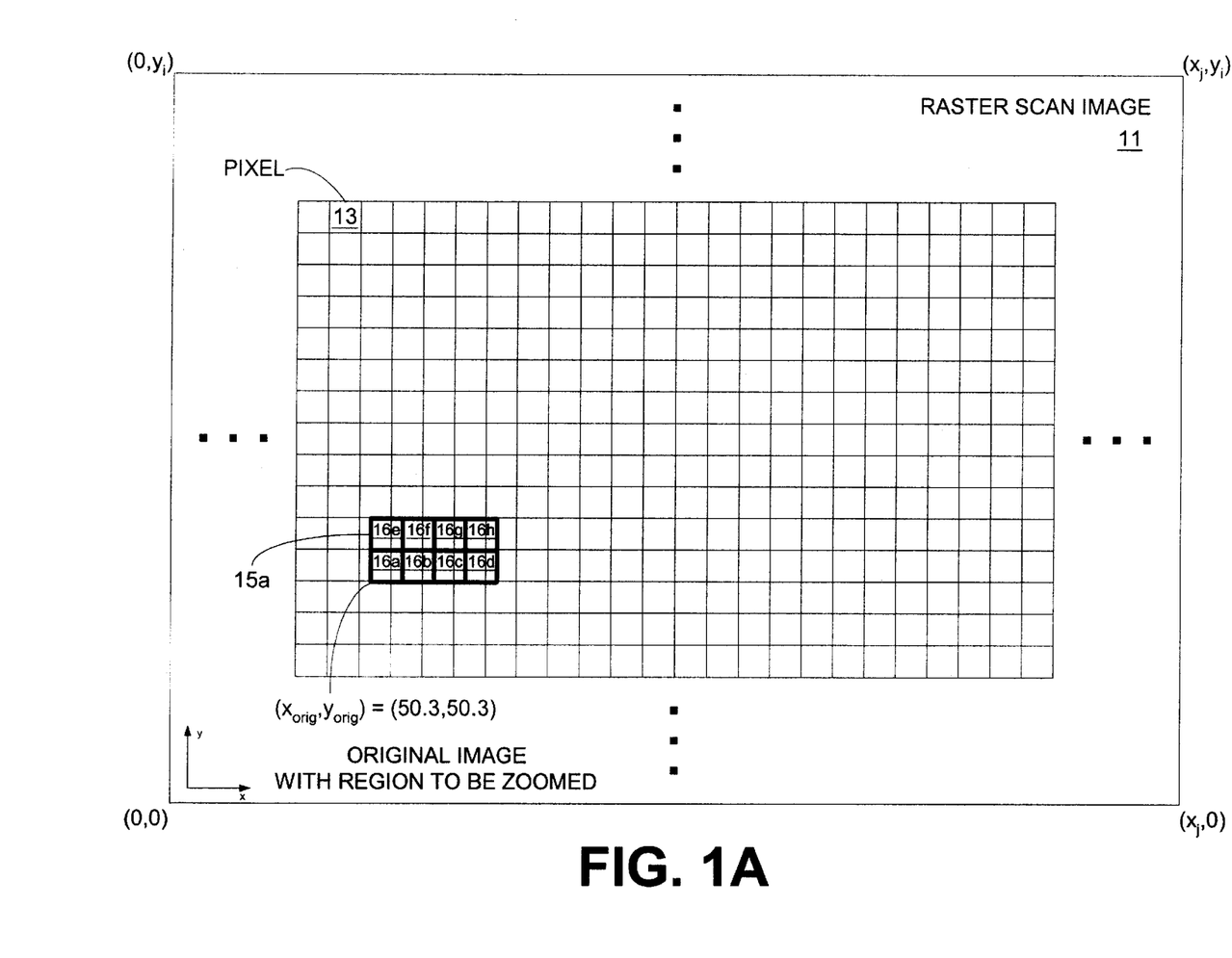
FIG. 1A is a graphical diagram of an original raster scan image showing a highlighted original region to undergo a zoom process.

FIG. 1A is a graphical diagram of an original raster scan image defined in an orthogonal x,y coordinate system (rows versus columns) showing a highlighted region 15a to undergo a zoom process. More specifically, FIG. 1A shows an image 11 having a plurality of pixels 13, the locations of which are defined in the x, y coordinate system having an origin (0,0) at the bottom left corner of the image 11 and extending along an x-axis to $x_f$ and extending along a y-axis to $y_f$. The rectangular highlighted region 15a of FIG. 1A, which in this example comprises a total of eight pixels (four in one row and four in another contiguous row), is zoomed and rendered, or produced, by the zoom function implemented in the rasterizer. Assume, for example, that the highlighted region 15a is to be zoomed, or enlarged, by +3.6 along the x and y axes, which would be represented by a floating point number in a rasterizer.

Recall that the OpenGL graphics specification, which is a well known computer graphics industry standard that was adopted around 1992, specifies a pixel zoom function, i.e., PixelZoom(float zoomX, float zoomY) performed at a raster position $x_{rp}$, $y_{rp}$ as a window defined by coordinates bounded by a rectangle with corners: ($x_{rp}$+zoomX*n, $y_{rp}$+zoomY*m) and ($x_{rp}$+zoomX*(n+1), $y_{rp}$+zoomY*(m+1)), where zoomX and zoomY are each a negative or positive amount of zoom, where n and m are respectively the row and the column of pixels in the image, and where the coordinates ($x_{rp}$,$y_{rp}$) defines the raster scan position in the two-dimensional x,y space of the image. Moreover, pursuant to the OpenGL specification, any partial pixel whose center lies inside of this rectangle (or on its bottom or left boundaries) are produced in correspondence with this particular group of elements.

Figure 1B:
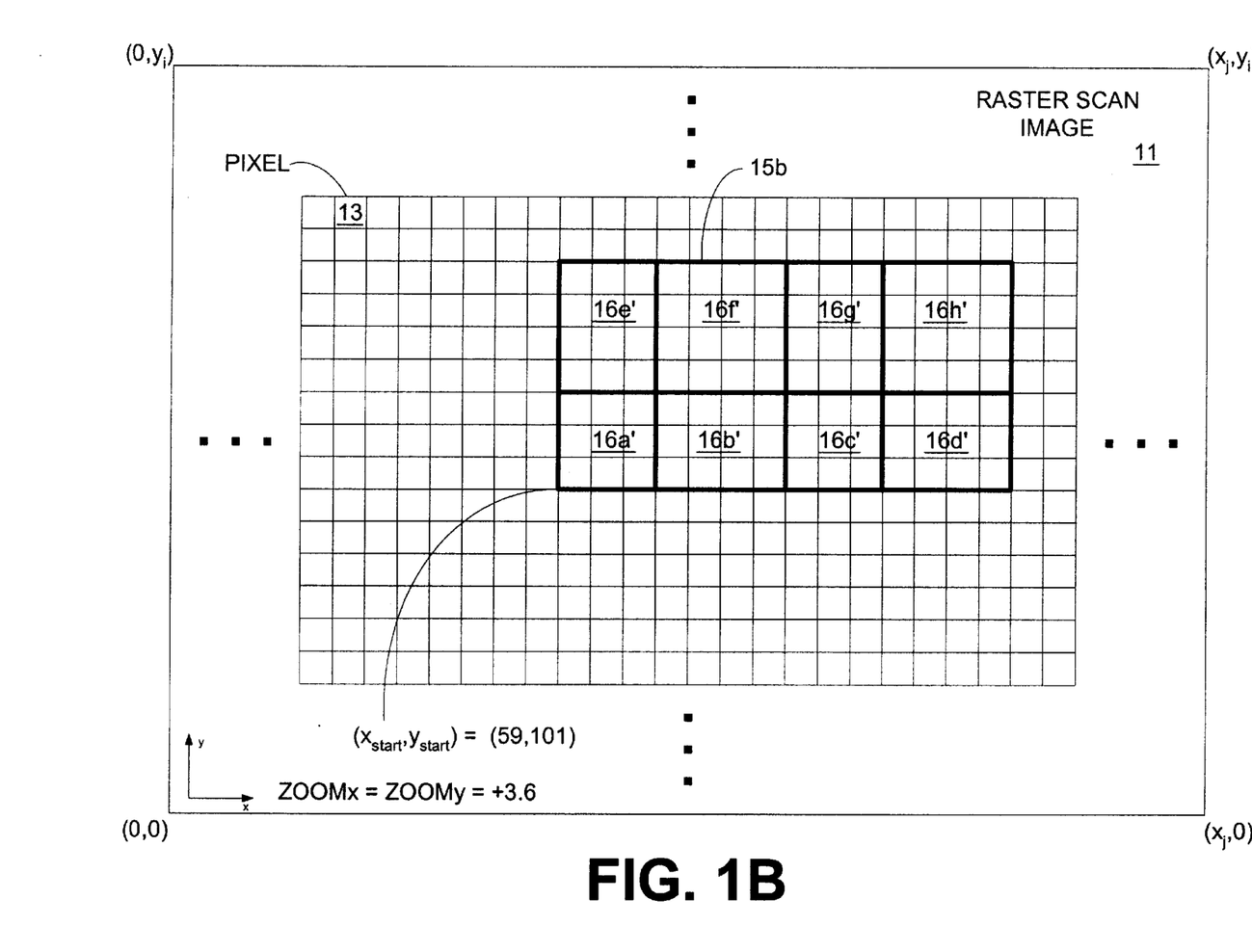
FIG. 1B is a graphical diagram of the image of FIG. 1A showing a highlighted zoomed region generally corresponding to the highlighted original region of FIG. 1A but processed via x and y zoom magnitudes (zoomX, zoomY) of +3.6 and +3.6, respectively, along an x-axis and a y-axis, respectively.

Using the OpenGL specification and the foregoing zoom specifications, the rasterizer implementing the zoom function will produce a new rectangular zoomed region 15b, as shown highlighted in FIG. 1B. Generally, FIG. 1B is a graphical diagram of the image 11 of FIG. 1A showing a highlighted zoomed region 15b generally corresponding to the highlighted region 15a of FIG. 1A but processed via x and y zoom magnitudes (zoomX, zoomY) of +3.6 and +3.6, respectively, as examples, along an x-axis and a y-axis, respectively. Although other schemes are possible, the rendering typically begins at the bottom left at the raster position with coordinates ($x_{start}$, $y_{start}$), which is (50.3, 50.3) in this example pursuant to the OpenGL specification, and proceeds along each span of the primitive from left to right in the x-axis direction and from span to span from bottom to top of the primitive in the y-axis direction. Comparing regions 15a and 15b, pixel blocks 16a–16h correspond to pixel blocks 16a'–16h', respectively. It can be seen from FIG. 1B that the resulting zoomed region 15b, resulting from application of the foregoing OpenGL specification, seems completely unpredictable as far as the zooming factors for each block 16a–16h. This is perhaps a reason why the time-consuming bounding comparisons of the prior art lasted as long as they have in currently implemented rasterizers. The beginning ($x_{start}$, $y_{start}$) of the new zoomed region 15b is offset from the original region 15a and the zooming by a floating point value, such as +3.6, results in widths of 3 to 4 and heights of 3 to 4 on a seemingly random basis.

Figure 1C:
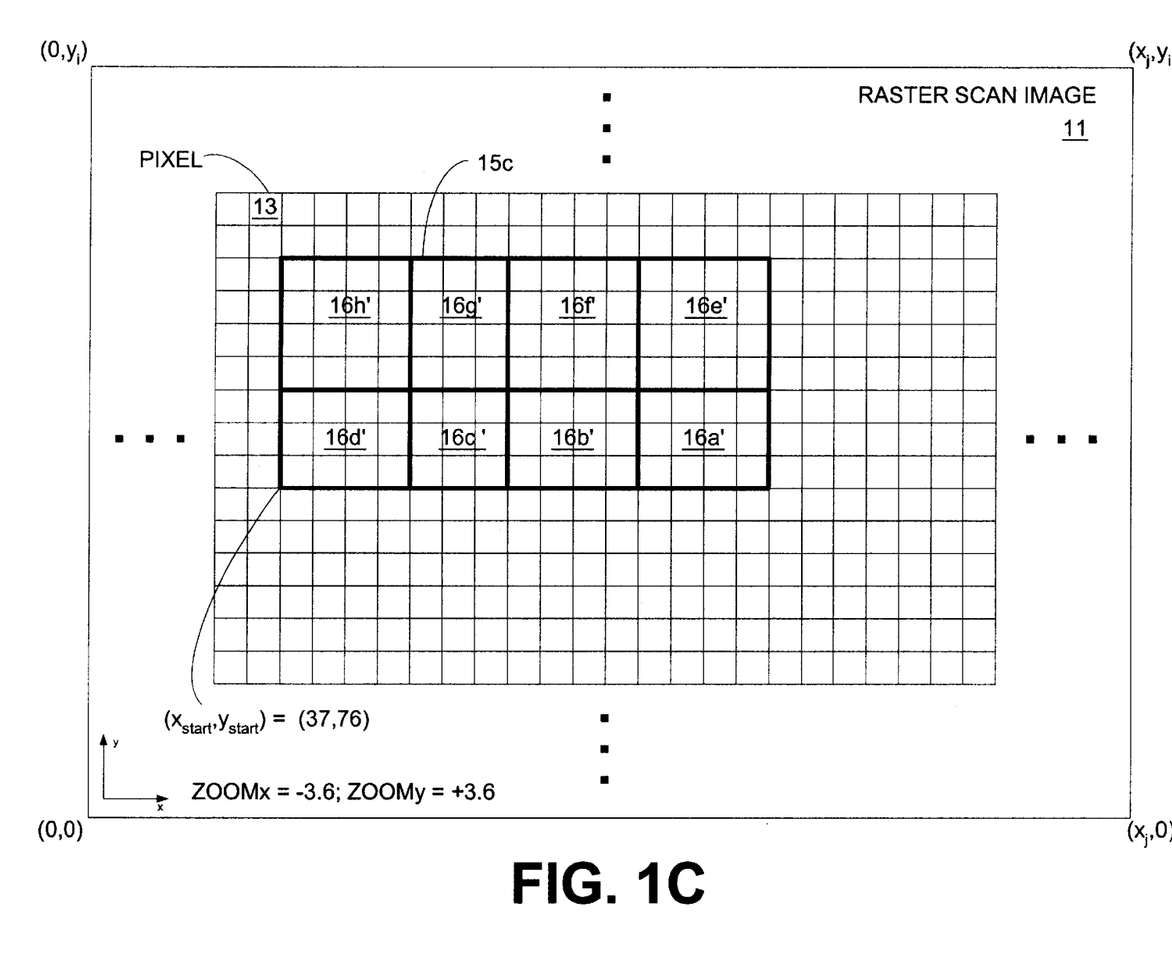
FIG. 1C is a graphical diagram of the image of FIG. 1A showing a highlighted zoomed region generally corresponding to the highlighted original region of FIG. 1A but processed via x and y zoom magnitudes (zoomX, zoomY) of −3.6 and +3.6, respectively, along an x-axis and a y-axis, respectively.

FIG. 1C is a graphical diagram of the image 11 of FIG. 1A showing a highlighted rectangular zoomed region 15c of pixels 13 generally corresponding to the highlighted region 15a of FIG. 1A but processed via x and y zoom magnitudes (zoomX, zoomY) of −3.6 and +3.6, respectively, as examples, along an x-axis and a y-axis, respectively. In this example, the original region 15a is reduced along the x-axis and enlarged along the y-axis. Rendering of the highlighted zoomed region 15c commences at ($x_{start}$, $y_{start}$)=(37, 75). Comparing regions 15a and 15c, pixel blocks 16a–16h of FIG. 1A correspond to modified pixel blocks 16a'–16h'in FIG. 1C, respectively. The foregoing starting position ($x_{start}$, $y_{start}$)=(37,75) can be determined using the bounding box methodology specified by the OpenGL specification, or alternatively, can be more efficiently determined in accordance with the system and method of the present invention.

Figure 1D:
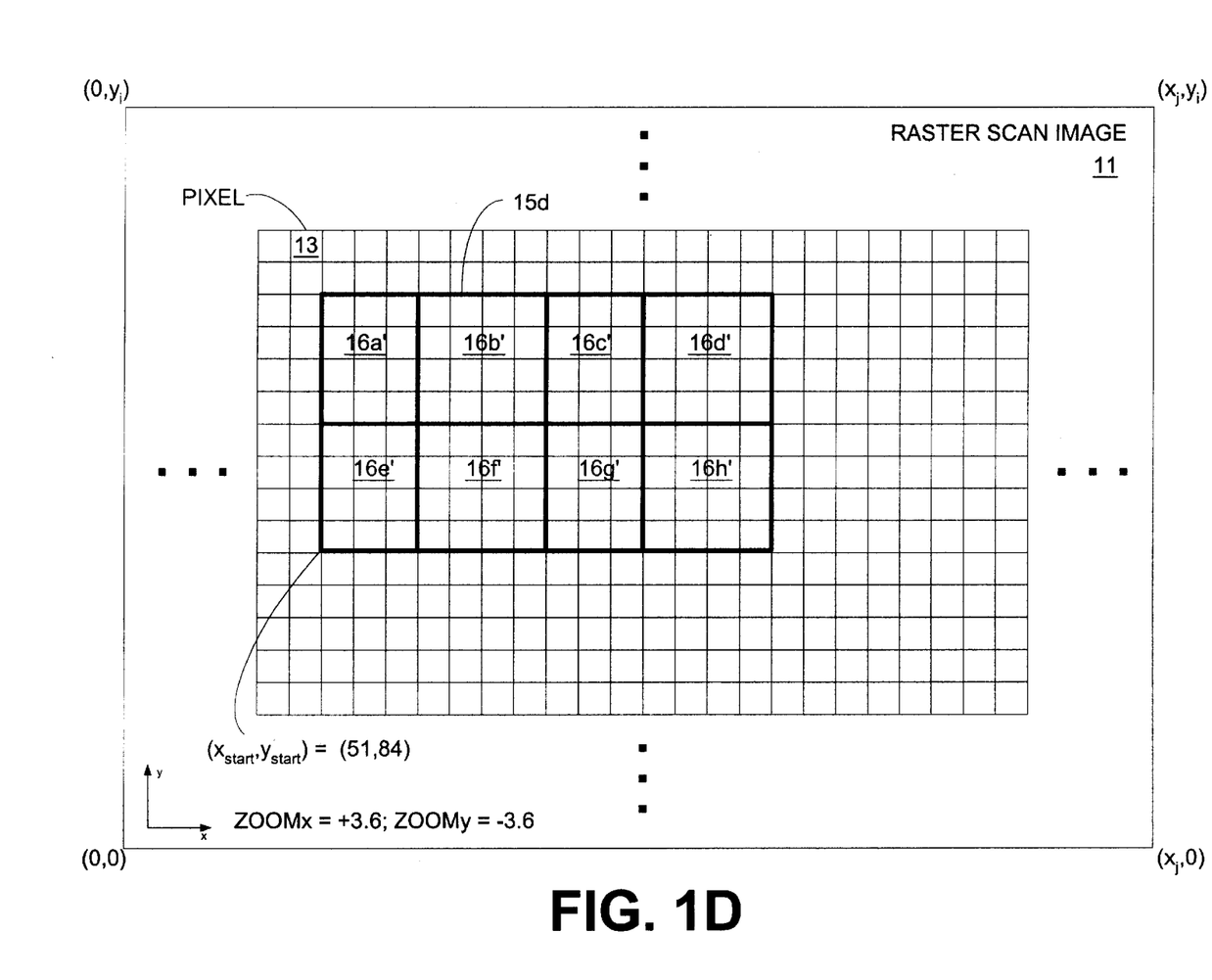
FIG. 1D is a graphical diagram of the image of FIG. 1A showing a highlighted zoomed region generally corresponding to the highlighted original region of FIG. 1A but processed via x and y zoom magnitudes (zoomX, zoomY) of +3.6 and −3.6, respectively, along an x-axis and a y-axis, respectively.

FIG. 1D is a graphical diagram of the image 11 of FIG. 1A showing a highlighted rectangular zoomed region 15d generally corresponding to the highlighted region 15a of FIG. 1A but processed via x and y zoom magnitudes (zoomX, zoomY) of +3.6 and −3.6, respectively, as examples, along an x-axis and a y-axis, respectively. In this example, the original region 15a is enlarged along the x-axis and reduced along the y-axis. Rendering of the highlighted zoomed region 15c commences at ($x_{start}$, $y_{start}$)=(51,84). Comparing regions 15a and 15d, pixel blocks 16a–16h of FIG. 1A correspond to modified pixel blocks 16a'–16h'in FIG. 1D, respectively. The foregoing starting position ($x_{start}$, $y_{start}$)= (51,84) can be determined using the bounding box methodology specified by the OpenGL specification, or alternatively, can be more efficiently determined in accordance with the system and method of the present invention.

Figure 1E:
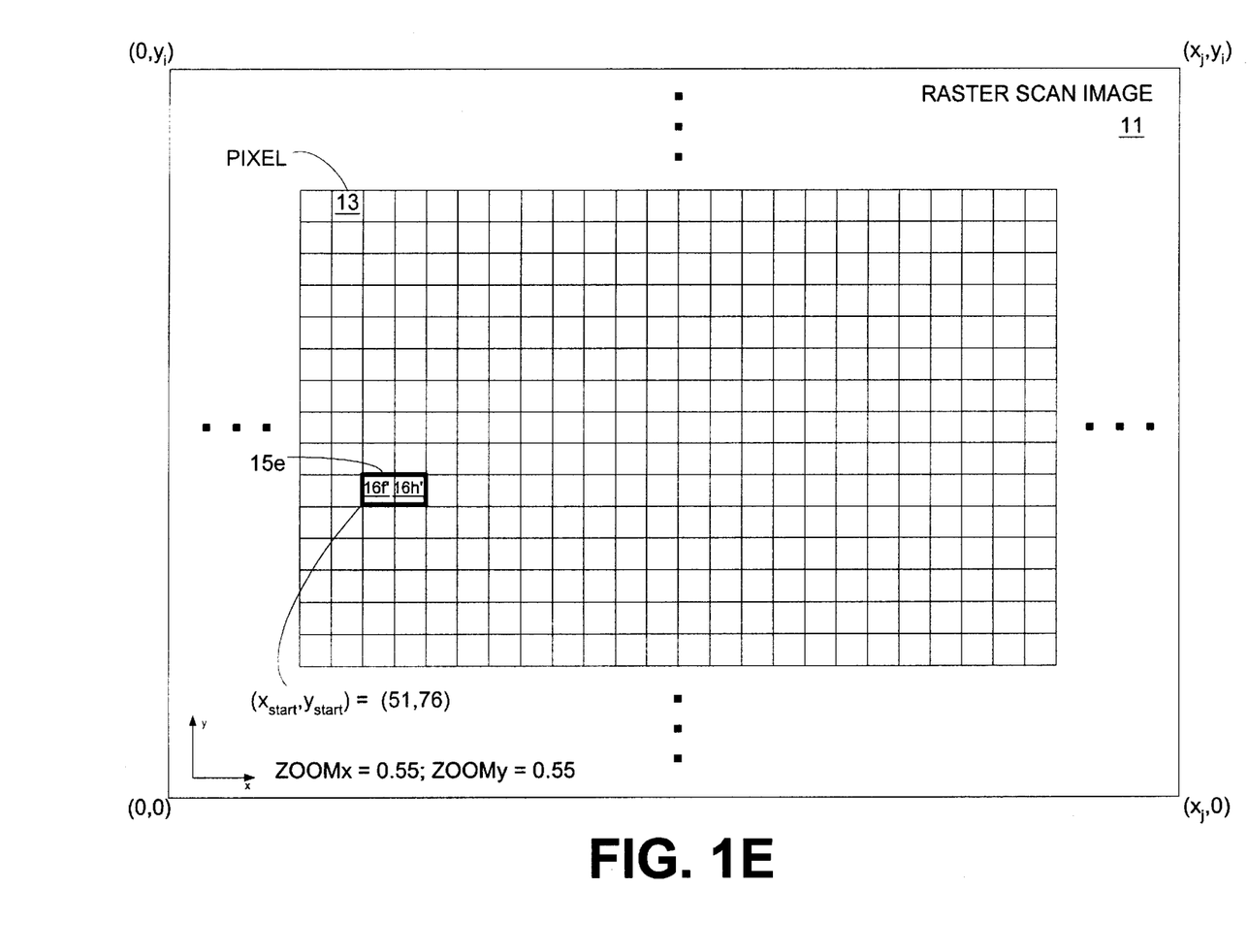
FIG. 1E is a graphical diagram of the image of FIG. 1A showing a highlighted zoomed region generally corresponding to the highlighted original region of FIG. 1A but processed via x and y zoom magnitudes (zoomX, zoomY) of +0.55 and +0.55, respectively, along an x-axis and a y-axis, respectively.

FIG. 1E is a graphical diagram of the image 11 of FIG. 1A showing a highlighted rectangular zoomed region 15e generally corresponding to the highlighted region 15a of FIG. 1A but processed via x and y zoom magnitudes (zoomX, zoomY) of +0.55 and +0.55, respectively, as examples, along an x-axis and a y-axis, respectively. In this example, the original region 15a is enlarged along the x and y axes, but by a fractional amount, where zoomX<1 and zoomY<1. Rendering of the highlighted zoomed region 15c commences at ($x_{start}$, $y_{start}$)=(51,76). Comparing regions 15a and 15e, pixel blocks 16a–16h of FIG. 1A correspond to modified pixel blocks 16f'–16h'in FIG. 1E, respectively. In this example, pixels are deactivated, as opposed to duplicated, in the zoomed region. The foregoing starting position ($x_{start}$, $y_{start}$)=(51,76) can be determined using the bounding box methodology specified by the OpenGL specification, or alternatively, can be more efficiently determined in accordance with the system and method of the present invention.

The pixel zoom system 20 of the present invention can be implemented in association with, for example but not limited to, a rasterizer, rendering mechanism, or other mechanism where raster scan conversion takes place in the computer graphics system. Moreover, the pixel zoom system can be implemented in hardware (FIGS. 2A and 2B), software (FIG. 5), firmware, or a combination thereof. When implemented in software or firmware, the pixel zoom system can be stored, transported, and/or utilized while residing on any computer-readable medium for use by or in connection with any suitable computer-based system, for example, a personal computer, workstation, minicomputer, or mainframe computer. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

A. First Embodiment

Figure 2A:
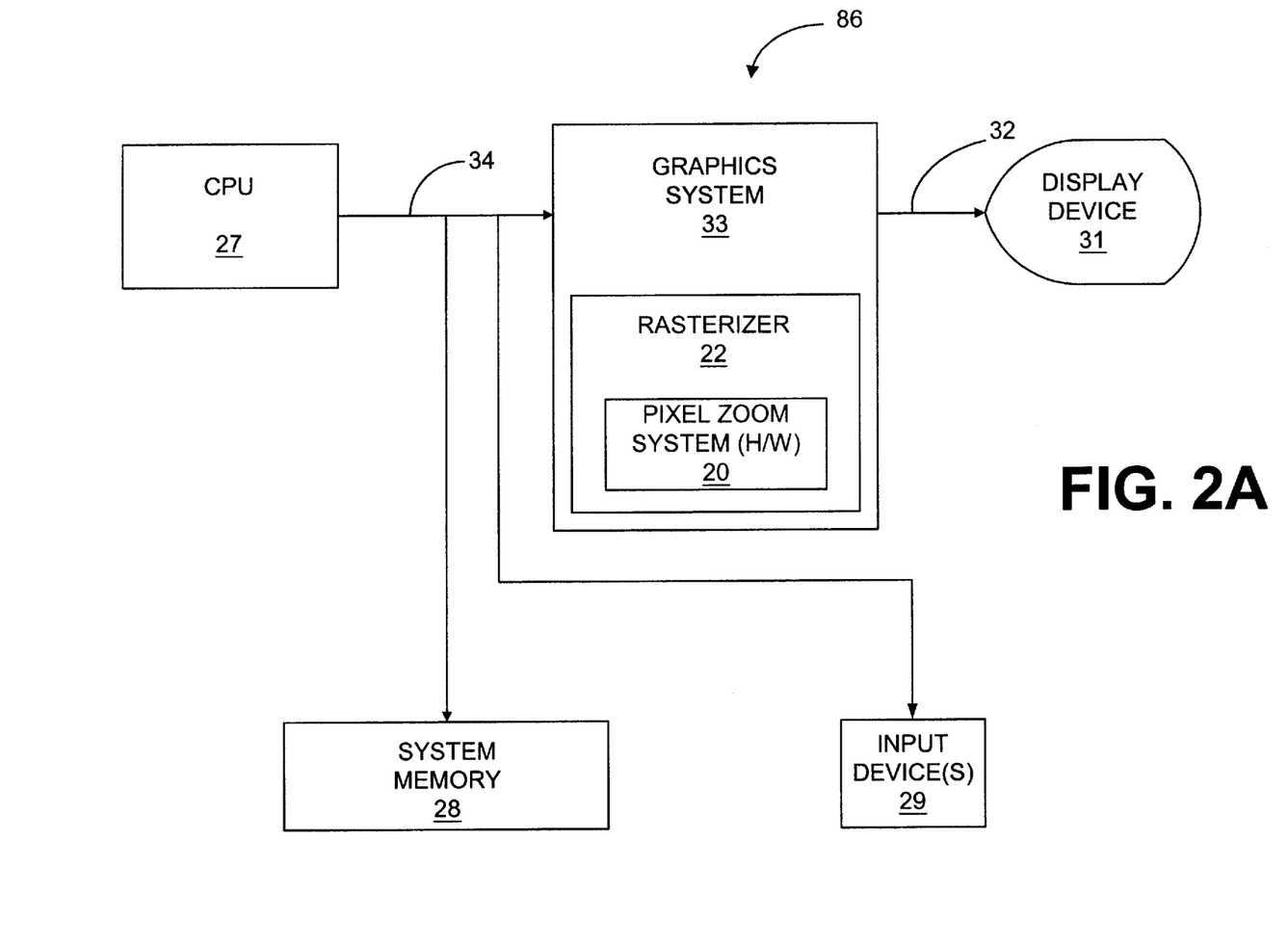
FIG. 2A is an electronic block diagram of a computer system having the pixel zoom system in accordance with a first embodiment of the invention implemented in a graphics system in connection with a rasterizer in hardware (H/W)
Figure 2B:
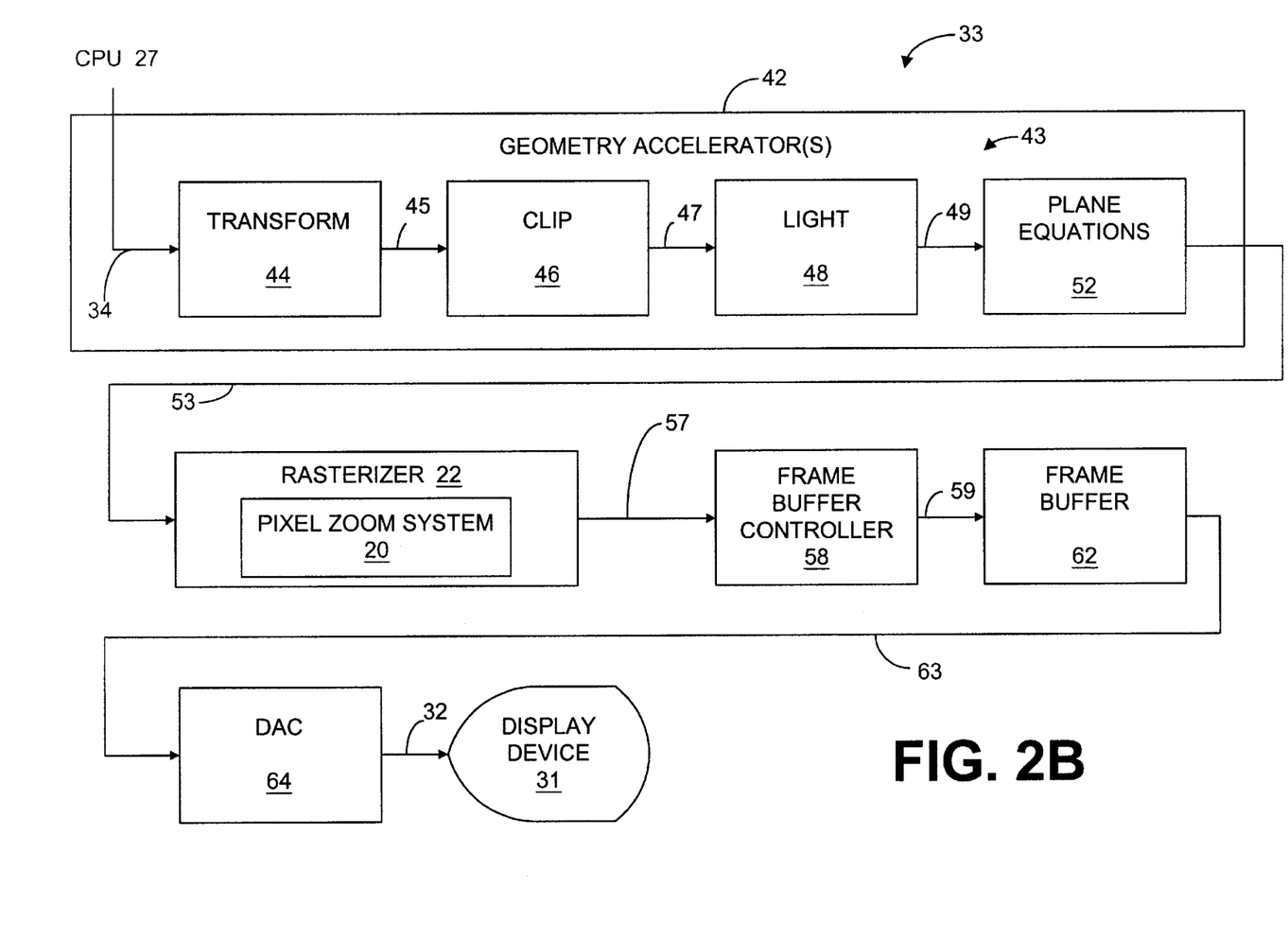
FIG. 2B is an electronic block diagram of a possible implementation of the graphics system of FIG. 1A.

A first embodiment of the pixel zoom system 20 of the present invention is set forth in FIGS. 2A and 2B. As shown in FIG. 2A, in this first embodiment, the system 20 as well as the rasterizer 22 are implemented in hardware (H/W) within the hardware-based graphics system 23 of a computer 26. The hardware can be, for example, combinational logic gates implemented as an application specific integrated circuit (ASIC)

As shown in FIG. 2A, the computer 26 includes a central processing unit (CPU) 27, a system memory 28 (one or collection of, e.g., RAM, ROM, nonvolatile memory, volatile memory, etc.) for storing software that is executed by the CPU 27, one or more input devices 29 (e.g., a mouse, keyboard, etc.) that can be operated by a user, a graphics system 33 for processing graphics data received from the CPU 27, a local interface 34, for example, one or more buses, configured to electrically interconnect the foregoing electronic elements, and a display device 31 (e.g., a computer monitor) electrically connected to the graphics system 33 via a connection 32 and configured to display the image data generated by the CPU 27 and further processed by the graphics system 33.

Primitives that define objects to be rendered are originated and provided to the graphics system 33 by the CPU 27, which defines each primitive in terms of a set of primitive data. For example, when the primitive is a triangular primitive, then the CPU 27 may define the primitive in terms of a set of x', y', z' pixel coordinates (unnormalized orthogonal coordinate system) corresponding with the triangular primitive's vertices, as well as set of color values (R, G, B values) for each vertex. Rendering hardware, associated with the rasterizer 22 of the graphics system 33, ultimately interpolates the data from the CPU 27, after several other processing stages, in order to produce the x, y, z screen coordinates (normalized orthogonal coordinate system) corresponding with the pixels 13 that are activated/deactivated to represent each primitive and the color values (R, G, B values) for each of the screen coordinates x, y, z. The x, y, z screen coordinate data is driven to the raster scan display device 31 by the graphics system 33.

A lower level electronic block diagram that more specifically illustrates the architecture of the hardware-based graphics system 33 is shown in FIG. 2B. Referring to FIG. 2B, the computer graphics system 33 includes one or more geometry accelerators 42 that are configured to receive vertex data from the CPU 27 and to define the primitives that make up the view to be displayed. Each geometry accelerator 42 may comprise any number of specialty control units 43 for processing the image data, including, for example, a transform mechanism (TRANS) 44 for performing transformations on the vertex data, such as scaling or moving a vertex in space, a clip mechanism (CLIP) 46 for clipping portions of objects that extend beyond a boundary, a light mechanism (LIGHT) 48 for enhancing the image data by simulating light conditions, and a plane equation mechanism (PLANE) 52 for defining the primitives in terms of mathematical floating point plane equations. Each of the control units 43 is typically implemented via cell logic and as separate distinct state machines. The output 53 of the geometry accelerator 42, referred to as rendering data, is used to generate final screen coordinates and color data for each pixel and each primitive. The output 53 is passed to a rasterizer 25, which converts the geometry accelerator output 53 to fixed point format from floating point format and which produces pixel data 57.

The pixel data 57 from the rasterizer 22 is next communicated to a frame buffer control 58 and then to a frame buffer 62. The frame buffer 62 serves to temporarily store the pixel data prior to communication to the display 21. The pixel data is passed from the frame buffer 62 through a digital-to-analog converter (DAC) 64 and then to the display device 31.

Figure 3:
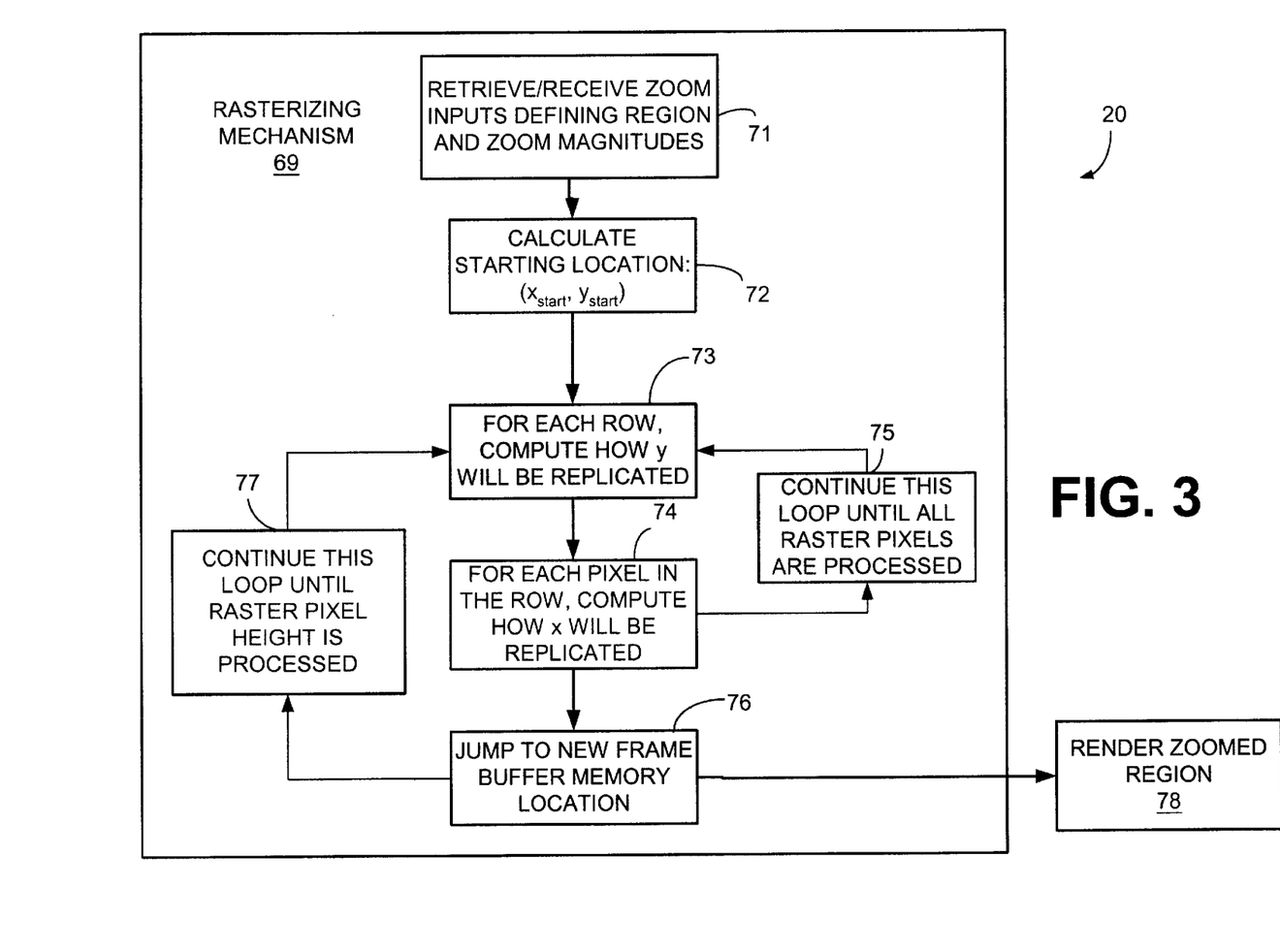
FIG. 3 is an electronic block diagram showing the architecture, functionality, and operation of a possible implementation of the pixel zoom system of FIGS. 1A and 1B in accordance with the present invention.

FIG. 3 is a block diagram showing the architecture, functionality, and operation of a possible implementation of the first embodiment of the pixel zoom system 20 of FIGS. 2A and 2B in accordance with the present invention. It should also be noted that the second embodiment of the pixel zoom system 20 of FIG. 4 uses generally the same logic shown in FIG. 3. Further note that, in the block diagram of FIG. 3, each block represents a module, segment, or portion of code, which comprises one or more executable instructions for implementing the specified logical function(s). It should also be noted that in some alternative implementations, the functions noted in the blocks may occur out of the order noted in FIG. 3. For example, two blocks shown in succession in FIG. 3 may in fact be executed substantially concurrently or the blocks may sometimes be executed in the reverse order, depending upon the functionality involved.

With reference to FIG. 3, generally, the pixel zoom system 20 includes a rasterizing mechanism 69, which is designed to define the zoomed raster image by performing at least the following operations: (1) determining a starting raster position ($x_{start}, y_{start}$) for the zoomed raster image; (2) determining a first number ($y_{replication}$=1, 2, etc.) of pixels 13 along the y-axis for each row of the original pixels 13 (determining how high each block 16 should be in the zoomed region); and (3) determining, for each row of the original pixels 13, a second number ($x_{replication}$=1, 2, etc.) of pixels 13 along the x-axis for each column of the original pixels 13 (determining how wide each block 16 should be in the zoomed region). As further illustrated in FIG. 3, rendering mechanism 78 is in communication with the rasterizing mechanism 69 and is designed to render the zoomed region based upon the starting raster position, the first numbers ($y_{replication}$'s) corresponding with the original pixel rows, the second numbers ($x_{replication}$'s) corresponding with the original pixel columns, as defined and forwarded to it by the rasterizing mechanism 69.

More specifically, referring to FIG. 3, the pixel zoom system 20 is prompted to retrieve or waits to receive one or more inputs (which can be preprocessed) from a user of the computer 26 via input device(s) 29 (FIG. 2A), advising the computer 26 and graphics system 33 to perform a zoom function. The region (for example but not limited to, region 15a highlighted in FIG. 1A) to be zoomed as well as the respective zoom magnitudes (zoomX, zoomY) along the x and y axes are input to the computer 26 and retrieved by the pixel zoom system 20, as indicated at block 71 in FIG. 3. The region may be input, for example, via having the user define a window around the region to be zoomed on a display screen associated with display device 31. The zoom magnitudes may be input via, for example, an input device 29, such as a keyboard. The region to be zoomed can be modified differently along its x and y axes. In other words, the region may be enlarged (abs|zoom|>1) along one axis, while reduced (abs|zoom|<1) along the other axis, or either enlarged or reduced by different magnitudes (zoomX, zoomY) along the x, y axes. In addition, the region may be flipped or translated, about the x axis (zoomX<0) or flipped about the y axis (zoomY>0). Furthermore, the zoom magnitudes may be integers (integer zoomX, integer zoomY) or floating point numbers (float zoomX, float zoomY). Finally, enlargement along an axis (x or y) basically involves rendering an appropriate number of duplicates for each pixel 13 in the zoomed region, while reduction along an axis generally involves deactivation of pixels 13.

Next, the pixel zoom system 20 calculates the starting location ($x_{start}, y_{start}$) for the new zoomed region (for example but not limited to, regions 15b–15e in respective FIGS. 1B–1E), given the particular input parameters, as denoted at block 72. To compute the starting location, the pixel zoom system 20 is designed to perform the following mathematical equations (where the mathematical operation "ceil(k)" means the smallest integer that is greater than or equal to k and where ($x_{rp}, y_{rp}$) is the raster position of pixels 13 in the original region 15 in the x,y coordinate system):

$x_{start} = ceil(x_{rp} - 0.5)$ if x zoom $z_x \geq 0$     Equation 1 or $x_{start} = ceil(x_{rp} + z_x - 0.5)$ if x zoom $z_x < 0$     Equation 2 and $y_{start} = ceil(y_{rp} - 1.5)$ if y zoom $z_y < 0$     Equation 3 or $y_{start} = ceil(y_{rp} + z_y - 1.5)$ if y zoom $z_y \geq 0$     Equation 4

Next, the heights of each pixel block 16 along the y-axis, or $y_{replication}$, are computed. For each row, $y_{replication}$ is computed as follows (where the mathematical operation "(Int32)(k)" means round k to a 32-bit integer):

$$y_{replication}=(Int32)(y_{start}-ceil(y_{rp}+z_y-1.5)) \text{ if } z_y<0 \quad \text{Equation 5}$$

$$\text{or } y_{replication}=(Int32)(y_{start}-ceil(y_{rp}-1.5)) \text{ if } z_y\geq 0 \quad \text{Equation 6}$$

If $x_{s\,max}<=x_{s\,min}$ or $y_{replication}<=0$, then the pixel 13 will not be rendered, or activated. Otherwise, there are $y_{replication}$ of pixels 13 to render for each block 16 in the row.

Next, as indicated at blocks 73, 74, and 75, a looping logical operation commences. The pixel zoom system 20 calculates a block width, or $x_{replication}$ for each pixel 13 in the original row, as follows:

For $z_x\geq 0$ $$x_{start}=ceil(x_{rp}+z_x-0.5) \text{ where } x \text{ is the last pixel's } x. \quad \text{Equation 7}$$

$$x_{replication}=(Int32)(ceil(x_{rp}-0.5)-x_{start}) \quad \text{Equation 8}$$

For $z_x<0$ $$x_{start}=ceil(x_{rp}-0.5) \text{ where } x \text{ is the last pixel's } x. \quad \text{Equation 9}$$

$$x_{replication}=(Int32)(ceil(x+z_x 0.5)-x_{start}) \quad \text{Equation 10}$$

Then draw $x_{replication}$ pixels if $x_{replication}>0$. Otherwise draw nothing.

$$x_{start}=x_{start}+z_x \quad \text{Equation 11}$$

Next, as indicated by blocks 76 and 77, the pixel zoom system 20 commences another looping operation the raster pixel height of the zoomed region is fully determined. As indicated at block 77, the pixel zoom system 20 jumps to a new frame buffer location by determining a new $y_{start}$, as follows:

$$y_{start}=y_{start}+z_x \quad \text{Equation 12}$$

Finally, after the rasterizing mechanism 69 has defined the zoomed region, then the rendering mechanism 78 of FIG. 3 renders the zoomed region. In this regard, the rendering mechanism 78 interpolates the data from the rasterizing mechanism 69, if desired, after other processing stages, in order to produce x, y, z screen coordinates (normalized orthogonal coordinate system) corresponding with the pixels 13 that are to be activated/deactivated to represent each primitive and the color values (R, G, B values) for each of the screen coordinates x, y, z. The x, y, z screen coordinate data is driven to the raster scan display device 31 by the graphics system 33.

B. Second Embodiment

A second embodiment of the invention will now be described with reference to FIG. 4. In general, FIG. 4 is an electronic block diagram of a computer system 86 having the pixel zoom system 10 of the invention implemented in software in a system memory 28 in connection with a rasterizer 22 and graphics software 88 that are also implemented in software (S/W).

Figure 4:
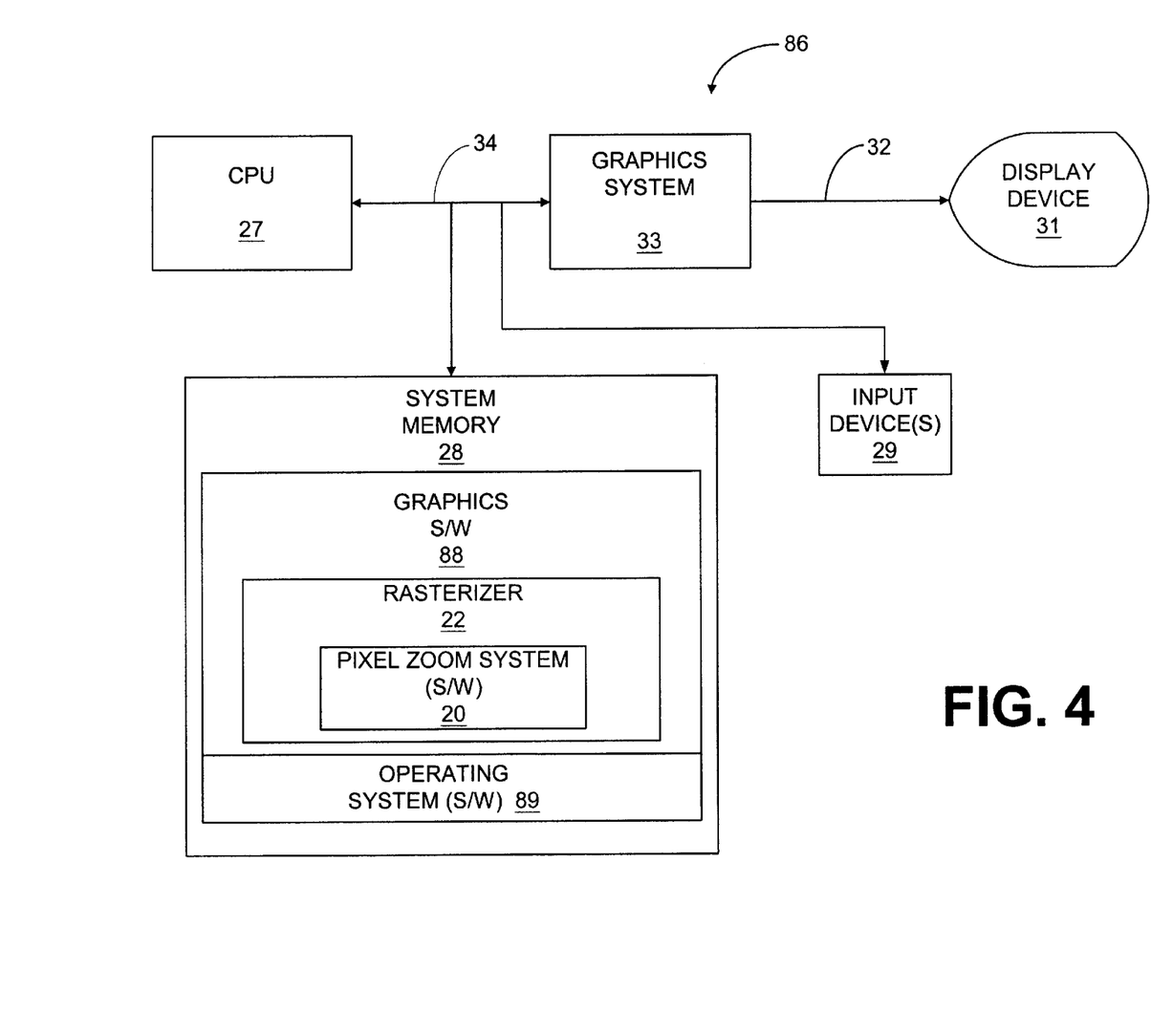
FIG. 4 is an electronic block diagram of a computer system having a pixel zoom system in accordance with a second embodiment of the invention implemented in a system memory in connection with a rasterizer in software.

As shown in FIG. 4, the computer 86 includes a CPU 27, a system memory 28 for storing software that is executed by the CPU 27, a graphics system 33 for processing graphics data received from the CPU 27, one or more input devices 29, a local interface 24 configured to electrically interconnect the foregoing elements, and a display device 21 connected to the graphics system 23 via a connection 22 and configured to display the image data generated by the graphics system 23.

The system memory 28 includes graphics software 88 as well as any suitable operating system 89, which are executed by the CPU 27. The graphics software 88 includes the rasterizer 22 that operates in order to convert primitive data into pixel data for the display device 31. The architecture, functionality, and operation of the pixel zoom system 20 in the computer 86 is shown in FIG. 4, which was previously described.

As is clear from the foregoing discussion, the first and second embodiments of the pixel zoom system 20 can be used to perform any zoom operation, for example, those shown in FIGS. 1B through 1E, in compliance with the OpenGL specification, while being less complicated and requiring far fewer mathematical computations, as compared to the bounding box technique typically implemented in connection with the Open GL specification.

In concluding the detailed description, it should be noted the any and all "preferred embodiments" described hereinabove are intended to be nonlimiting examples of possible implementations. It will be obvious to those skilled in the art that many variations and modifications may be made to such preferred embodiments without substantially departing from the principles of the present invention. Any and all alternative embodiments resulting from such variations and modifications are intended to be included herein within the scope of the present invention and protected by the following claims.

Appendix

This Appendix illustrates mathematical derivations for the following equations that are utilized by the pixel zoom system 20 of the present invention: $x_{start}$, $x_{replication}$, zoomX, $y_{start}$, $y_{replication}$, zoomY. In a strict mathematical sense, there is one derivation for $x_{start}$, $x_{replication}$, for positive zoomX, one derivation for negative zoomX, one derivation for $y_{start}$, $y_{replication}$, for positive zoomY, and finally, one derivation for negative zoomY. All other possible derivations for equations for any combination of zoom that is possible, directly follow from these four derivations, and so, for simplicity, all other derivations are not included.

Each of the following derivations is started by converting the graphics specification to a set interval representation. The next step converts raster positions (real value) in screen coordinates. Then, the open and closed intervals are used to determine an appropriate mathematical ceil function. To make the methodology of the present invention more efficient, a well known mathematical Lemma function is utilized over and over again. Generally, the Lemma operation is used to determine more efficient replication calculations.

Negative ZoomX Case

For $z_x<0$, the specification requires colors of raster position $x_{rp}$ to duplicate within $\lfloor x_{rp}+z_x,x_{rp})$, where $z_x$ is a real number representing the zoom of x.

The screen position $x_s$ will lie within:

$$[x_s]=\lfloor x_{rp}+z_x-0.5,x_{rp}-0.5)$$

$$=ceil(x_{rp}+z_x-0.5)$$

$x_{start}=x_{smin}$=smallest integer containing (since closed interval)

$$=ceil(x_{rp}+z_x-0.5)$$

$$=ceil(x_{rp}-\tilde{z}_x-0.5) \text{ where } \tilde{z}_x=-z_x>0$$

Note in the Lemma ceil(a+n)=ceil(a)+n
Where n∈J positive integers.

$$x_{s\,max} = ceil(x_{rp} - 0.5) - 1$$

$$x_{replicate} = x_{s\,max} - x_{s\,min}$$

$$= ceil(x_{rp} + z_x - 0.5) - ceil(x_{rp} - 0.5)$$

If $x_{replicate} > 0$
  draw Pixel $x_{replicate}$ times
else
  skip Pixel

Non-Negative ZoomX Case

Zero and Positive

For $z_x > 0$ $$\lfloor x_p \rfloor = \lfloor x_{rp}, x_{rp} + z_x \rfloor$$

Screen Coordinate $$\lfloor x_s \rfloor = \lfloor x_{rp} - 0.5, x_{rp} + z_x - 0.5)$$

$$x_{start} = x_{s\,min} = ceil(x_{rp} - 0.5)$$

$$x_{s\,max} = ceil(x_{rp} + z_x - 0.5) - 1$$

$$x_{replicate} = x_{s\,max} - x_{s\,min}$$

$$\lfloor x_p \rfloor = ceil(x_{rp} + z_z - 0.5) - ceil(x_{rp} - 0.5)$$

If $x_{replicate} > 0$
  draw Pixel $x_{replicate}$ times
else
  skip Pixel

Non-Negative Zoom Y Case

Positive and Zero

For $z_y > 0$ $$\lfloor y_p \rfloor = \lfloor y_p, y_p + z_y)$$

Screen Coordinate $$\lfloor y_s \rfloor = \lfloor y_p - 0.5, y_p + z_y - 0.5)$$

subtract 1 and use Lemma to get $$y_{s\,max} = ceil(y_p + z_y - 1.5)$$

$$y_{start} = ceil(y - 0.5)$$

Calculate row pixels (note that origin of the x and y axes is the lower left of the image):

$$y_{replicate} = \text{start } y - y_{s\,max}$$

if $y_{replicate} > 0$
  draw row $y_{replicate}$ times
else
  skip row

Negative ZoomY Case $$z_y < 0 \quad \lfloor y_p \rfloor = \lfloor y_p + z_y, y_p)$$

$$y_s = \lfloor y_p + z_x - 0.5, y - 0.5)$$

$$y_{start} = y_{s\,min} = ceil(y_p - 1.5)$$

$$y_{s\,max} = ceil(y_p + z_y - 0.5)$$

Row Pixels $$y_{replicate} = y_{s\,min} - y_{s\,max}$$

If $y_{replicate} > 0$
  draw row $y_{replicate}$ times
else
  skip row

End of Appendix

What is claimed is:

1. A method for efficiently implementing a pixel zoom function in a computer graphics system, comprising the steps of:
   (a) defining a zoomed image of a region in an original raster image having pixels defined in a coordinate system with orthogonal first and second axes, the region comprising a plurality of original pixels, by:
      (1) determining a starting raster position for said zoomed raster image;
      (2) determining a first number of first pixels along said first axis for each row of said original pixels; and
      (3) for each row of said original pixels, determining a second number of second pixels along said second axis for each column of said original pixels; and
   (b) rendering said zoomed image based upon said starting raster position, said first numbers corresponding with said original pixel rows, said second numbers corresponding with said original pixel columns.

2. The method of claim 1, wherein said zoomed image is smaller in pixel size than said original image.

3. The method of claim 1, wherein said zoomed image is larger in pixel size than said original image.

4. The method of claim 1, wherein said first number is determined based upon a first zoom magnitude and wherein said second number is determined based upon a second zoom magnitude that is different than said first zoom magnitude.

5. The method of claim 1, further comprising the step of performing steps (a)(2) and (a)(3) successively on successive rows of said original pixels.

6. The method of claim 1, further comprising the step of receiving input information identifying said region to be zoomed.

7. The method of claim 1, implemented with a processor programmed by software.

8. The method of claim 1, implemented with combinational logic in hardware.

9. The method of claim 1, wherein said defining step is implemented with a processor programmed by software and said rendering step if implemented with combinational logic in hardware.

10. The method of claim 1, further comprising the step of receiving input information identifying a zoom magnitude along said first and second axes.

11. The method of claim 10, wherein any of said starting raster position, said zoom magnitude along said first axis, and said zoom magnitude along said second axis is a floating point number.

12. The method of claim 10, wherein the set of said starting raster position, said first zoom magnitude along said first axis, and said second zoom magnitude along said second axis comprises both floating point and integer numbers.

13. A computer graphics system for efficiently implementing a pixel zoom function, comprising:

(a) a rasterizer designed to define a zoomed image of a region in an original raster image having pixels defined in a coordinate system with orthogonal first and second axes, the region comprising a plurality of original pixels, by:
  (1) determining a starting raster position for said zoomed raster image;
  (2) determining a first number of first pixels along said first axis for each row of said original pixels;
  (3) determining, for each row of said original pixels, a second number of second pixels along said second axis for each column of said original pixels; and
(b) a rendering mechanism designed to render said zoomed image based upon said starting raster position, said first numbers corresponding with said original pixel rows, said second numbers corresponding with said original pixel columns.

14. The system of claim 13, wherein said rasterizer performs steps (a)(2) and (a)(3) successively on successive rows of said original pixels.

15. The system of claim 13, further comprising an input mechanism for receiving input information identifying said region to be zoomed.

16. The system of claim 13, wherein said rasterizer and said rendering mechanism are implemented with a processor programmed by software.

17. The system of claim 13, wherein said rasterizer and said rendering mechanism are implemented with combinational logic in hardware.

18. The system of claim 13, further comprising an input mechanism for receiving input information identifying a zoom magnitude along said first and second axes.

19. The system of claim 18, wherein any of said starting raster position, said zoom magnitude along said first axis, and said zoom magnitude along said second axis is a floating point number.

20. The system of claim 18, wherein the set of said starting raster position, said zoom magnitude along said first axis, and said zoom magnitude along said second axis comprises both floating point and integer numbers.

* * * * *